C. Fleming.
Rotary Measure.
N° 304.
31,308.
Patented Feb. 5, 1861.

Witnesses
D B Greene
E S Ormsby

Inventor
Charles Fleming

N. PETERS, PHOTO-LITHOGRAPHER, WASHINGTON, D. C.

UNITED STATES PATENT OFFICE.

CHARLES FLEMING, OF YPSILANTI, MICHIGAN.

INSTRUMENT FOR MEASURING LUMBER.

Specification of Letters Patent No. 31,308, dated February 5, 1861.

*To all whom it may concern:*

Be it known that I, CHARLES FLEMING, of the city of Ypsilanti, in the county of Washtenaw and State of Michigan, have invented a new and useful Improvement in Machines for Measuring Lumber; and I do hereby declare that the following is a full, clear, and exact description of the same, reference being had to the accompanying drawings, making part of this specification, in which—

Figure 2:
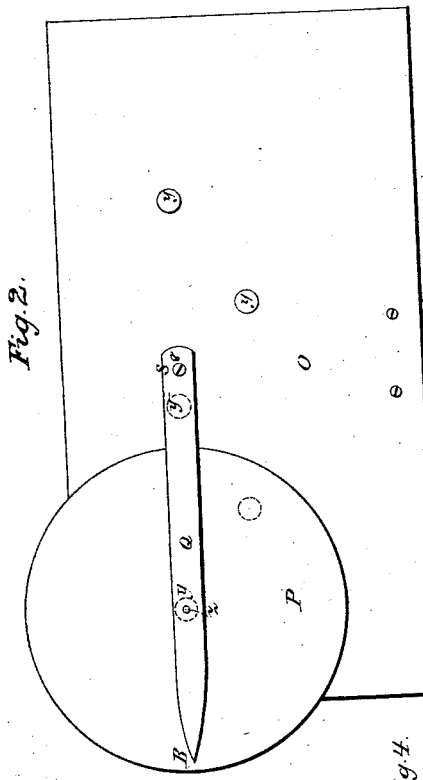
Figure 3:
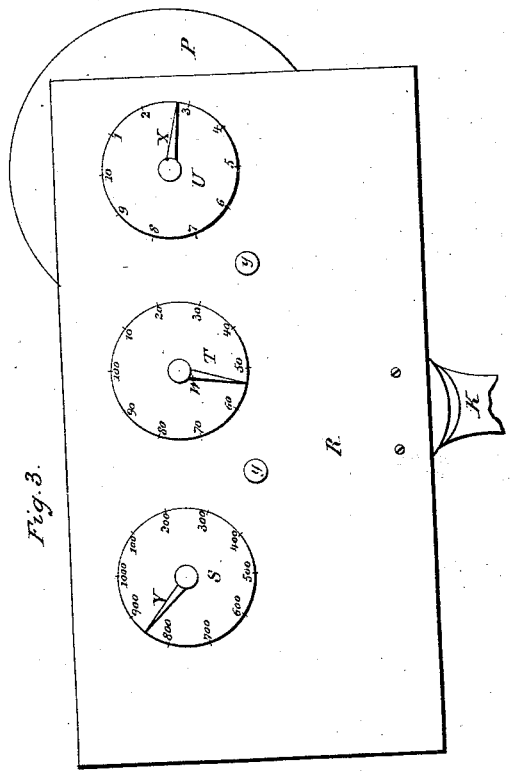
Figure 4:
Figure 1:
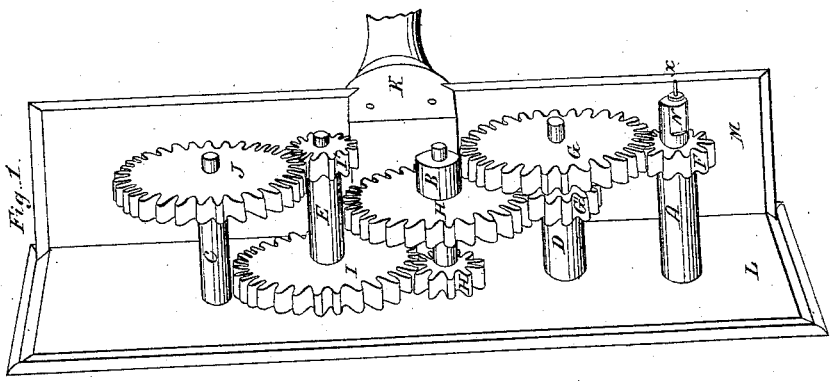

Figure 1, is a perspective view of the interior of the instrument. Fig. 2, is a front elevation. Fig. 3, is a rear elevation of the same. Fig. 4, is a perspective view of the perambulating wheel and spring detached.

Similar letters of reference indicate corresponding parts in the several figures.

My invention relates to instruments employed to indicate the superficial measure of a quantity of boards of known length by running transversely across their surface. In such machines it is evidently necessary to provide such adjustment as to vary the indications given by the perambulating wheel in accordance with the varying lengths of boards to be measured.

My improvement consists in a peculiar combination of spring, index and perambulating wheel to facilitate the substitution of wheels of different diameter as well as to control the same and assist in their adjustment.

A, B, and C, are shafts adapted to rotate simultaneously in the same direction but at different speeds through the medium of gearing F, G, G', H, H', I, I', and J, as clearly shown in Fig. 1.

P, is the perambulating wheel attached on the exterior to the projecting end N, of the shaft A.

Q, is an index, arm, pivoted at S, to the face O, of the instrument, and perforated to fit over the pivot $x$, as shown in Figs. 1 and 4. The index Q, is constructed of spring steel, and exerts a pressure upon the face of the wheel P, to prevent its too free motion.

X, W, and V, are indices attached to the rear ends of the shafts A, B, C, to indicate upon dials U, T, and S, on the back R, of the instrument, the extent to which said shafts are rotated.

K, indicates the position of the handle.

The gearing is so proportioned and ad-ranged that ten revolutions of the shaft A, will impart one revolution to the shaft B, and ten revolutions of the shaft B, will impart one revolution to the shaft C, and their respective dials are graduated and marked accordingly.

The operation of the instrument will be understood by the following explanation. Supposing the boards which it is desired to measure, to be twelve feet in length, and the wheel P, to be ten inches in circumference it is evident that in every revolution performed by the said wheel in passing across the boards ten superficial feet will be measured; every inch in the breadth of a twelve foot board being equal to a superficial foot. Accordingly the numbers 1 to 10 on the dial U, of the index X, which revolves coincidently with the wheel P, will indicate superficial feet measured, while the divisions of the dials T, and S, indicate respectively tens and hundreds. To commence measuring the respective indices are set at "10" "100" and "1000" and the mark B, on the wheel P, being first set opposite the end of the index Q, is placed accurately at the edge of the board. The instrument is then run across any number of boards of equal length, care being taken to note the number of thousands indicated by the index V, and the entire area of the boards will be accurately shown. If it be desired to measure boards of another length the index Q, is first sprung up from the pivot $x$, and then swung around to permit the removal of the wheel P. The said wheel is then lifted from its shaft, and replaced with one bearing proper proportion to the length of the boards to be measured. For this purpose a set of wheels of accurate sizes for lengths of boards in common use are provided with each instrument.

Having thus described my invention, what I claim as new and desire to secure by Letters Patent, is—

The combination with the index shafts A, B, C, connecting gearing, and perambulating wheel P, of the spring, index Q, pivoted at S, retained in position by the pivot $x$, and adapted to press upon the face of the wheel P, the said parts being constructed and operating in the manner and for the purposes herein shown and described.

CHARLES FLEMING.

Witnesses:
D. B. GREENE,
E. S. ORMSBY.